United States Patent
Jackson

[15] 3,662,703
[45] May 16, 1972

[54] TIRE UNDERINFLATION TELLTALE DEVICE

[72] Inventor: Richard M. Jackson, 42 Augar St., Hamden, Conn. 06517

[22] Filed: Sept. 3, 1970

[21] Appl. No.: 69,336

[52] U.S. Cl. .................................. 116/34, 116/114, 222/3
[51] Int. Cl. ....................................................... B60c 23/06
[58] Field of Search ........................ 116/34, 67, 32, 124 B, 70, 116/114; 73/146.3, 146.8; 137/227; 117/106; 222/3; 239/577, 583

[56] References Cited

UNITED STATES PATENTS

| | | | |
|---|---|---|---|
| 2,468,829 | 5/1949 | La Porta | 116/67 |
| 2,697,635 | 12/1954 | Ivins et al. | 239/583 X |
| 2,964,050 | 12/1960 | Novak | 116/124 B |
| 3,191,816 | 6/1965 | Fead et al. | 239/587 X |
| 3,476,073 | 4/1969 | Jackson et al. | 116/34 |
| 3,263,644 | 8/1966 | Irby | 116/32 |

FOREIGN PATENTS OR APPLICATIONS 338,383    6/1959    Switzerland.................116/DIG. 44

Primary Examiner—Louis J. Capozi
Attorney—Walter Spruegel

[57] ABSTRACT

A casing with two compartments has in one cylinder compartment a plunger, and in the other compartment a replaceable spray can which has some sliding freedom therein, with the plunger being on one side subjected to air pressure which is always the same as the air pressure in an associated tire, and being on its other side subjected to the force of a preloaded spring which will displace the plunger when the tire pressure drops below a given safe minimum pressure. The can is provided with a normally closed valve which is depressible for opening, and the plunger will, on displacement, move the can with its valve against an abutment to thereby depress and open the valve for discharge of a telltale spray from the can and its passage through a tube against the tire to form a readily perceptible telltale mark or blot thereon.

14 Claims, 6 Drawing Figures

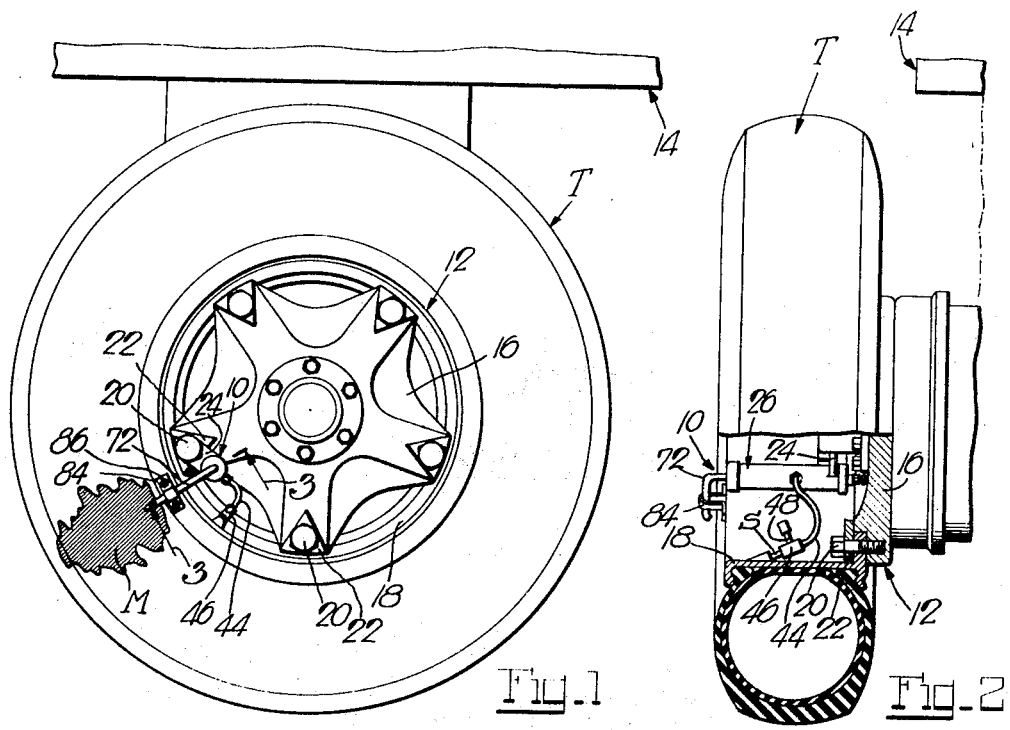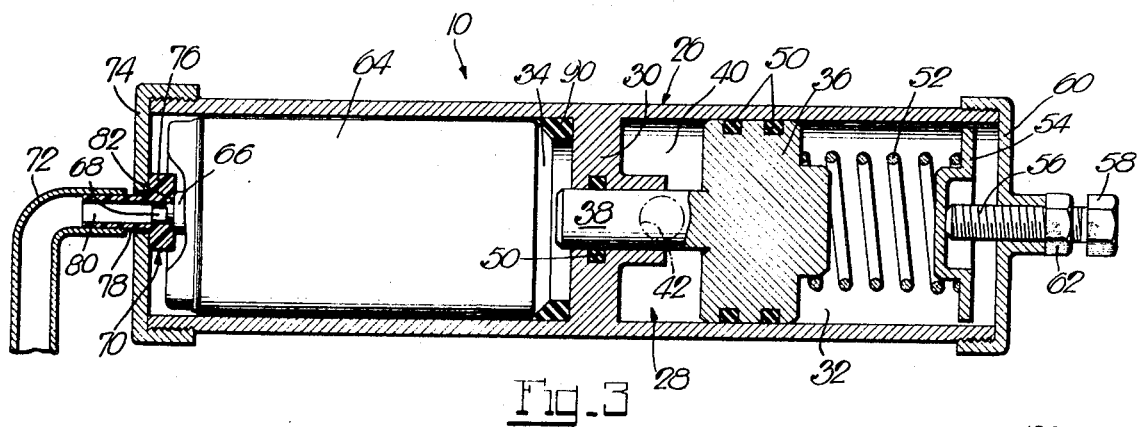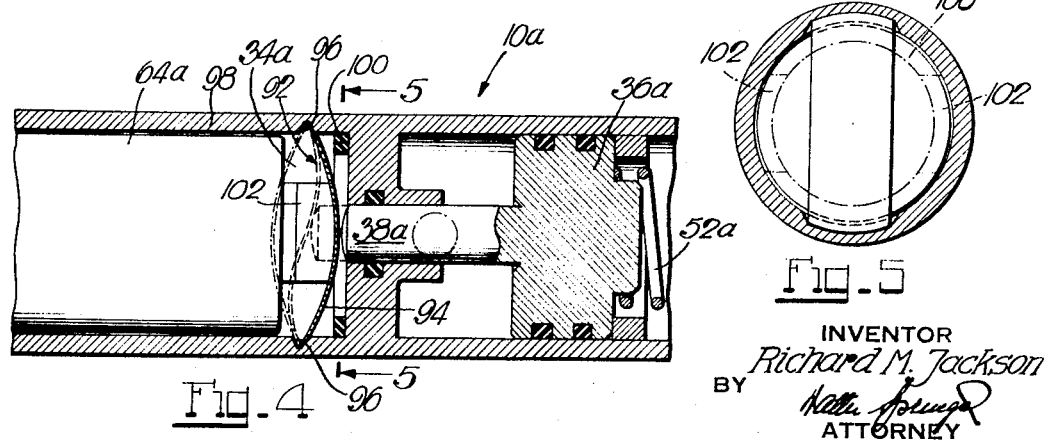

TIRE UNDERINFLATION TELLTALE DEVICE

This invention relates to tire-deflation telltale devices in general, and to tire-deflation telltale devices of tire-marking type in particular.

A prior telltale device of this type is disclosed in the patent to Jackson et al. U.S. Pat. No. 3,476,073, dated Nov. 4, 1969. This prior telltale device is carried by a wheel of a power vehicle, such as a truck, for example, and provides a cylinder with a plunger therein which divides the cylinder chamber into opposite end compartments, of which one compartment is in communication with the air in the tire on the wheel, and the other compartment holds a liquid and has an outlet which is normally closed by valve action of the plunger, with the plunger being by a spring displaced so as to open the outlet when confronted with air below a safe minimum tire pressure, whereupon the liquid will escape through the outlet and spray against the tire to leave a telltale blot thereon. This prior device is thus characterized in that a cylinder compartment serves as a reservoir for the telltale liquid, and this liquid is normally held captive therein by valve action of the plunger.

It is the primary object of the present invention to provide a telltale device of this type in which the telltale liquid is contained, not in a normally closed compartment, but rather in a replaceable separate sealed container in the same compartment but with its outlet permanently open, with the plunger acting to open the container for discharge of the liquid therefrom when the tire pressure drops below a safe minimum pressure. With this arrangement, the task of recharging the device with telltale liquid is not only greatly facilitated, but may readily be attended to by any driver anywhere and immediately on restoration of the tire pressure to safe pressure following a pressure drop below safe minimum pressure, requiring mere quick replacement of the empty container with a full container which is advantageously carried on the vehicle as an available spare container. Further, by providing for simple replacement of an empty container with a full container, the device may be recharged with telltale liquid, without requiring special refill equipment and rolling of the wheel into a position in which to refill the device with liquid from the top, as was required with the aforementioned prior device.

It is another object of the present invention to provide a telltale device of this type of which the aforementioned replaceable container is a spray can containing an aerosol suspension of gas and telltale substance, preferably liquid, and being provided with a normally closed valve, and the plunger will, on tire pressure drop below the safe minimum pressure, open the valve for discharge of the contents of the can and its spray against the wheel, and preferably against the tire thereon, to leave a telltale blot thereat. With this arrangement, the contents of the can is reliably pressurized from the time the can is factory-charged to and during its discharge from the can, and its forced even discharge from the can will leave a particularly perceptible telltale blot on the wheel or tire at any speed of the vehicle or when the same is at rest with the wheel in any position.

It is a further object of the present invention to provide a telltale device of this type of which the can-holding compartment receives the can with some longitudinal sliding freedom, and has an end carrying a spray tube which directs telltale spray against the wheel or tire and has in the interior of the compartment a valve-type seat, and the valve on the can is provided at one end thereof, and is normally yieldingly forward projected into closed position and includes a central duct through which the contents of the can discharges when the valve is depressed into open position, with the valve being next to and aligned with the interior seat on the spray tube, and the plunger acting, on tire pressure drop below the safe minimum pressure, to slide the can with its valve firmly against the seat on the spray tube and continue such slide of the can to depress and open the valve for application of a telltale blot on the wheel or tire. With this arrangement, the can lies in the compartment with its valve relaxed and, hence, safely self-closed, except when it is by pressure-drop responsive action of the plunger forced against and opened by the internal seat on the spray tube for sole discharge of the contents of the can into and through the spray tube, whereby neither the compartment nor the plunger are ever subjected to telltale spray not even on its discharge from the can, and, hence, will remain clean and dry and thus never interfere with operational sliding freedom of any, including a replacement, can or with pressure-drop responsive displacement of the plunger. Further, the only valve in the device is embodied in replaceable cans which are preferably made in well-proven low-cost mass production by manufacturers specializing in such spray cans, wherefore the device as such is valve-less and, hence, of exceeding structural simplicity and low cost. Moreover, with the plunger being reliably sealed in its cylinder compartment against air leakage into the normally non-sealed can-holding compartment, air from the tire cannot possibly escape through the device, but can escape only through occasionally developing other leakage paths to which the device is intended to, and will fully, respond.

Another object of the present invention is to provide a telltale device of this type of which the aforementioned closed end of the can-holding compartment is really open, but normally closed by a detachable, preferably screw-on, cover which carries the spray tube with its internal seat. With this arrangement, a spray can may be replaced in the device by merely removing the cover, withdrawing the empty can from the compartment, and after restoring tire pressure to a safe level by whatever measure the cause of the preceding tire pressure failure indicates, and thereby causing retraction of the plunger from can-operating reach, simply sliding a full can axially into the compartment and reclosing the cover on the latter.

A further object of the present invention is to provide a telltale device of this type in which there is interposed between the acting plunger and the can in its compartment a two-position snap-over device which is normally in a home position in which it resiliently opposes displacement of the plunger into reach of the can, but will, on overpowering displacement of the plunger on tire-pressure drop below the safe minimum pressure, give way and suddenly and forcefully snap into its other, active position in the course of which it will as suddenly and forcefully advance the can for reliable opening of its valve and discharge of the contents of the can against the wheel or tire. With this arrangement, the valve-opening response of the can to tire-pressure drop below the safe minimum pressure is by powerful snap action which by its sudden release will break the can loose from any binding hold it may have in its compartment from any cause, and especially during long-time undisturbed presence of the same in the compartment. Moreover, the snap-over device may be wholly contained in the device and require no external reset provisions, for on merely axially sliding a full can into its compartment as aforementioned, the can will engage the snap-over device in its active position and on continued slide-in snap it back to its home position.

It is still another object of the present invention to provide a telltale device of this type of which the aforementioned snap-over device is of exceeding structural simplicity and low cost, by providing the same in the form of a single longitudinal leaf spring, and providing diametrically opposite notches in the inner periphery of the can-holding compartment, with the spring being longer than the inside diameter of the compartment and forceable in bowed fashion into the compartment through the open end thereof for snap with its ends into the notches for their firm anchorage therein. With this arrangement, snap-over of the spring from either of its bowed positions to its other bowed position is through transitional S-flexure of the spring with its characteristic powerful snap action.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a fragmentary side view of a vehicle showing one of the wheels thereof with an installed telltale device embodying the invention;

FIG. 2 is a fragmentary end view of the vehicle with the wheel and tire thereon being shown partly in section and partly in elevation;

FIG. 3 is an enlarged section through the featured telltale device as taken on the line 3—3 of FIG. 1;

FIG. 4 is a fragmentary longitudinal section through a telltale device embodying the invention in a modified manner;

FIG. 5 is a section taken on the line 5—5 of FIG. 4; and

Figure 6:
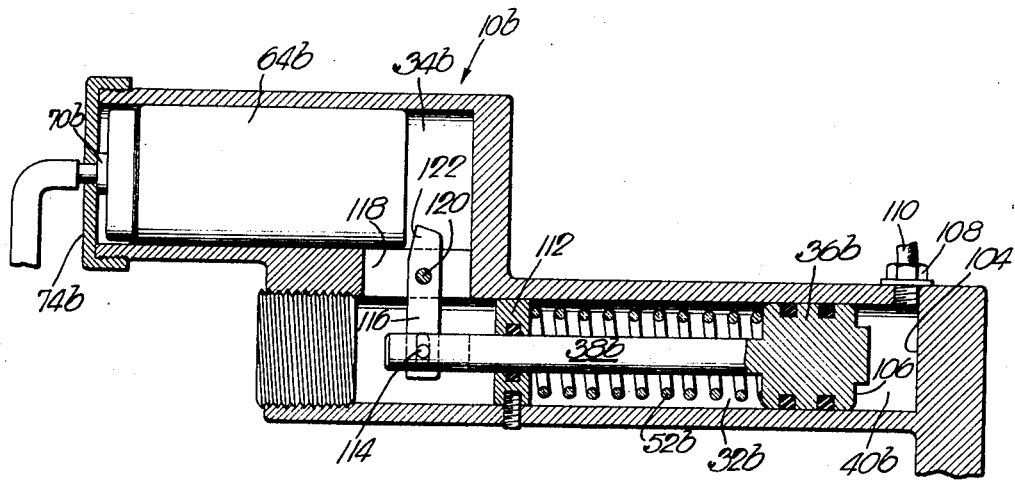
FIG. 6 is a longitudinal section through a telltale device embodying the invention in a further modified manner.

Referring to the drawings, and more particularly to FIGS. 1 and 2 thereof, the reference numeral 10 designates a telltale device for a pneumatic tire T on a wheel 12 of a vehicle 14, and especially a heavy-duty vehicle such as, for example, a truck having the usual driver's compartment or cab with side mirrors through which to observe the load-carrying tires when riding. The wheel 12, which may be conventional in every respect, provides the usual spider 16 on a drive axle and a demountable rim 18 on which the tire T is mounted, with the rim 18 being normally held on the spider 16 by bolts 20 through intermediation of lugs 22. The telltale device 10 is provided with a lug 24 with which it is removably mounted on the wheel 12 by one of the bolts 20.

The telltale device is adapted to produce on the tire a telltale mark M when the tire pressure drops below a certain pressure, and more particularly below a safe minimum pressure. The device provides a casing 26 which has an internal passage 28, preferably cylindrical, and an internal partition 30 which divides the passage 28 into a cylinder chamber 32 and a compartment 34 (FIG. 3). The mounting lug 24 is in this instance a side lug on the casing 26 (FIGS. 1 and 2). Slidable in the cylinder chamber 32 is a plunger 36 having a shank 38 which extends with a sliding fit through the partition 30 and into the compartment 34 (FIG. 3). The cylinder space 40 between the partition 30 and plunger 36 is the active cylinder end because it holds air under the same pressure as that in the tire T. To this end, the casing 26 is provided with a port 42 which is open to the active cylinder end 40 (FIG. 3), and is through a flexible hose 44 connected with a T-fitting 46 (FIGS. 1 and 2) which serves as an adapter and is applied, preferably screwed, to the exposed valve stem s of the tire T. The usual check valve is in this instance removed from the valve stem s, and the check valve is provided in the lateral branch 48 of the adapter 46 so that the tire may be inflated through this branch 48, but the compressed air in the tire will be in permanent communication with the cylinder end 40 through the adapter 46, hose connection 44 and port 42 in the casing 26. Suitable sealing rings 50 in the plunger 36 and partition 30 prevent any air leakage from the cylinder end 40.

The compressed air in the cylinder end 40 urges the plunger 36 to the right, but such plunger displacement is opposed by a spring which in this instance is a compression spring 52 in the side of the cylinder chamber 32 opposite to the active cylinder end 40, with this spring 52 being interposed between the plunger 36 and a dished retainer 54 which bears against the shank 56 of an adjustment screw 58 that is threadedly received in a cover 60 which, in turn, is threadedly received by the casing 26 to close the open end of the cylinder chamber 32. While the spring 52 is preferably calibrated to shaft the plunger 36 to the left (FIG. 3) and activate the telltale device when the air pressure in the cylinder end 40, and hence in the tire T, drops below a given safe minimum pressure, the adjustment screw 58 is, nevertheless, desirable in that it affords fine-adjustment of the spring force as well as relaxation of the spring in fully assembled, but not yet mounted, telltale devices. The screw 58 is preferably locked in any adjusted position by a nut 62. The cover 60 is advantageous in that it keeps dirt and other matter from the cylinder chamber 32.

The telltale substance, preferably liquid, is contained in a replaceable spray can 64 in the form of an aerosol suspension of gas or air and telltale liquid. The spray can 64 is received with a sliding fit in the compartment 34, and has at its forward end a valve 66 which in its normally closed position is in the forwardly projected position shown in FIG. 3, and which on depression will open for spray discharge from the can 64 through a central discharge duct 68. On depression of the valve 66 in a manner described hereinafter, the valve will open and release spray from the can, with this spray passing directly into and through a nipple 70 and through a therewith connected spray tube 72 which directs the spray against the tire T for the formation of the telltale mark or bolt M thereon (FIG. 1). The nipple 70, which in this instance is carried by a releasably attachable, preferably screwed-on, cover 74 on the casing 26 that closes the open end of the compartment 34, has within the cover 74 an end collar 76 with a reduced shank 78 which extends through an aperture in the cover and receives the spray tube 72. The nipple 70 has a central passage 80 in communication with the spray tube 72. The nipple 70 has a central passage 80 in communication with the spray tube 72, and the end collar 76 of the nipple has around the passage 80 a seat 82 for the valve 66. The nipple 70 is in this instance mounted in the cover 74 sufficiently loosely to permit screwing of the latter onto and from the casing 26 without turning the nipple, with the spray tube 72 being suitably locked against angular displacement from an intended spray area on the tire, as by a clamp 84 suitably mounted on the wheel rim 18, as by screws 86, for example. Thus, by quickly unscrewing the cover 74 from the casing 26 and the clamp 84 from the wheel rim 18, the cover and spray tube may be removed and a spray can 64 slid into or from the compartment 34 through the open end thereof. Once a full can is thus slid into the compartment 34, the cover 74 and clamp 84 are as quickly screwed onto the casing 26 and wheel rim 18, whereupon the telltale device is again in operating condition.

Operational depression, and hence opening, of the valve 66 of the spray can 64 on a tire pressure drop below a given safe minimum pressure, is preferably and advantageously by enforced axial sliding movement of the can in the compartment 34 to the left in FIG. 3, whereby on such can movement the valve 66 rests on the nipple 70, and more particularly on the seat 82 thereon, and is thus depressed for discharge of telltale spray from the can and its passage through the tube 72 and against the tire to form the telltale mark or blot M thereon. Such enforced axial sliding of the can 64 to the end of depressing, and thereby opening, the valve 66, is by the shank 38 of the plunger 36. Thus, on a tire-pressure drop approximately to the given safe minimum pressure, the spring force on the plunger 36 may be in substantial equilibrium with the air pressure in the active cylinder end 40, but on a more or less slight further tire-pressure drop below the given safe minimum pressure the spring 52 will shift the plunger to the left (FIG. 3), with the shank 38 of the plunger first moving into engagement with the can 64 and then pushing the latter forward beyond the position shown to thereby cause opening of the valve 66.

The can 64 has in the compartment a slide fit which is preferably relatively loose to obviate binding of the same in the compartment if perchance a small amount of dirt should get into the compartment or some dust accumulate therein after a particularly long time of undisturbed rest of the can therein. Such a relatively loose sliding fit of the can in the compartment may entail occasional slight operational endshake of the can, especially when the vehicle passes at high seed through a sharp curve, but such endshake of the can is never strong enough to cause depression, and hence opening, of the valve 66. However, even the slightest operational endshake of the can may be avoided if desired, by inserting in the compartment 34 a spacer ring 90, preferably of soft rubber or like material, with this spacer ring holding the can with its closed valve 66 in loose or near abutment with the nipple 70, as shown (FIG. 3).

Reference is now had to FIG. 4 which shows a modified telltale device 10a which may in all respects be like the described telltale device 10 of FIG. 3, except that in this modified device 10a there is provided a two-position snap-over device 92 which, on tire-pressure drop below the given safe minimum pressure, forces the can 64a forward to cause depression, and hence opening, of its valve. The snap-over device is in this instance in the simple form of a leaf spring 94 which with its ends is firmly anchored in diametrically opposite notches 96 in the peripheral wall 98 of the compartment 34a (see also FIG. 5). The leaf spring 94 is of greater length than the inside diameter of the compartment 34a, wherefore the same is oppositely curved or bowed in its full-line inactive and dot-and-dash line active positions. Thus, the leaf spring 94 in its full-line inactive position is in this instance slightly spaced from the shank 38a on the plunger 36a when the tire pressure is safe and within normal limits, i.e., above the given safe minimum pressure. However, when the tire pressure drops to and beyond the given safe minimum pressure, the plunger 36a will by its spring 52a be displaced to the left (FIG. 4), whereby the plunger shank 38a will engage the leaf spring 94 and deflect the same in the only way possible, namely in S-like flexure as shown in dotted lines, with the leaf spring soon thereafter snapping under its own force into the active dot-and-dash line position with a snap action which is characteristically powerful for recovery from S-flexure. It is in the course of its powerful snap into the dot-and-dash line position that the leaf spring 94 engages and unfailingly forces the can 64a to the left (FIG. 4) for causing depression, and hence opening of its valve. Of course, once the valve is opened in this fashion, the entire contents of the can will be discharged, so that the empty can will have to be replaced with a full can for restoring the telltale device into operating condition. In thus inserting a full can into the compartment 34a, after first restoring tire pressure to a safe limit by whatever measure the cause of the preceding tire pressure failure indicates, the can is thus inserted with sufficient force to flex the leaf spring 94 from its active dot-and-dash line position through the transitional dotted-line S-flexure sufficiently to cause the spring to snap back into its inactive full-line position. If desired, occasional slight endshake of the can 64a may be avoided by inserting into the compartment 34a a ring 100 of soft rubber or like material, having on opposite sides of the leaf spring 94 integral spacer ears 102 against which the can will normally rest, with these ears 102 being, however, sufficiently resilient to give way to the forced-in can for the described return by the same of the leaf spring 94 into its inactive full-line position.

The described telltale devices 10 and 10a of FIGS. 3 and 4 are of exceeding structural simplicity, having a minimum of simple parts, including a slender casing with axially aligned cylinder and can compartments, whereby the plunger itself, through its shank, directly activates the spray can, and the active cylinder end is between the plunger and the partition in the casing.

Reference is now had to FIG. 6 which shows a further modified telltale device 10b in which the active cylinder end 40b is between an endwall 104 of the cylinder chamber 32b and a face 106 of the plunger 36b opposite to that from which its shank 38b extends, and the can compartment 34b is laterally offset from the cylinder chamber 32b, whereby the can 64b is activated other than directly by the shank of the plunger. The active cylinder end 40b is through a fitting 108 connected with a flexible hose 110 which is in communication with the valve stem of the tire so that this cylinder end is under the same air pressure as the tire. Interposed between a collar 112 in the chamber 32b and the plunger 36b is the action spring 52b, with the plunger shank 38b extending with a sliding fit through the collar 112 and having therebeyond a floating pivot connection 114 with one end of an operating lever 116 which extends through a slot 118 in the casing 26b and is therein pivotally mounted at 120, with the other arm 122 of the lever 116 extending into the compartment 34b immediately behind the can 64b therein.

In operation of the device, and on tire-pressure drop below a given safe minimum pressure, the spring 52b will displace the plunger 36b to the right, whereby the plunger shank 38b will rock the lever 116 anticlockwise so that its arm 122 will engage the can 64b and shift the same forward to cause depression, and hence opening, of its valve by the nipple 70b on the removable end cover 74b which closes the compartment 34b.

What is claimed is:

1. An underinflation telltale device for a pneumatic tire with a valve stem on a vehicle wheel, comprising a casing mounted on said wheel and having a compartment and a cylinder chamber with an end; a plunger in said chamber, with said chamber end being in communication with said valve stem so as to hold the same air pressure as the tire; preloaded spring means in said chamber tending to displace said plunger against the compressed air in said chamber end; a tire-marking device, including a spray can in said compartment and conduit means for directing spray from the can against said tire, said can containing an aerosol suspension of gas and telltale liquid, and having a normally closed spray discharge valve depressible for opening; and means acting to depress said valve on plunger displacement by said spring means when the air pressure in said chamber end drops below a certain pressure.

2. An underinflation telltale device as in claim 1, in which said compartment has an internal abutment, said can has in said compartment sliding freedom to and from said abutment, said valve faces and is aligned with said abutment, and said means act on said plunger displacement to slide said can toward said abutment for depression of said valve by said abutment.

3. An underinflation telltale device as in claim 2, in which said abutment is an end part of said conduit means, and said valve has a central discharge duct which on depression of said valve is in communication with said end part of said conduit means.

4. An underinflation telltale device as in claim 3, in which said endpart of said conduit means has a seat on which said valve, when depressed, is seated with a sealing fit to keep spray from the interior of said compartment.

5. An underinflation telltale device as in claim 3, in which said compartment is cylindrical and coaxial with said chamber and separated therefrom by a partition in said casing, with said partition forming part of said one chamber end and one end of said compartment, said compartment having another end carrying said end part of said conduit means, said can has an axial sliding fit in said compartment, and said means provide a shank on said plunger extending with a sealing sliding fit through said partition and into said compartment.

6. An underinflation telltale device as in claim 5, in which said chamber is closed at its end opposite to said one end thereof, and said spring means is a compression spring interposed between said plunger and opposite chamber end.

7. An underinflation telltale device as in claim 5, in which said chamber is closed at its end opposite to said one chamber end, said spring means is a compression spring, and there is further provided an adjustment screw threadedly received in said opposite chamber end and carrying in said chamber a spring retainer, with said compression spring being interposed between said plunger and retainer.

8. An underinflation telltale device as in claim 5, in which said other compartment end is open through which to slide said can into and from said compartment, and there is further provided a cover releasably attached to said casing to close said other compartment end, and carrying said end part of said conduit means.

9. An underinflation telltale device as in claim 8, in which said cover is threadedly received by said casing to close said other compartment end.

10. An underinflation telltale device as in claim 5, in which said means further provide a snap-over device in said compartment between said can and partition, with said device having an element resiliently snappable into first and second positions in which it is in the path of said shank on said plunger displacement and holds said can into an active position in which its valve is depressed, respectively, with said element being snapped from said first position over into said second position by said shank on said plunger displacement, and said element will on said snap-over from said first position to said second position slide said can into said active position.

11. An underinflation telltale device as in claim 10, in which said snap-over device includes diametrically opposite notch formations in the inner periphery of said compartment, and said element is a leaf spring anchored with its ends in said notch formations and being oppositely curved in said first and second positions, with said leaf spring passing through S-flexure on snap-over from either position to the other position.

12. An underinflation telltale device as in claim 11, in which said other compartment end is open through which to slide said can into and from said compartment, with said can, on slide-in into said compartment, snapping said leaf spring from said second position into said first position when the tire pressure is above said certain pressure, and there is further provided a cover releasable attached to said casing to close said other compartment end, and carrying said end part of said conduit means.

13. An underinflation telltale device as in claim 2, in which said compartment is laterally displaced from said chamber, said plunger has opposite faces, of which one face is subjected to the air pressure in said chamber end, and said means provide a shank on the other face of said plunger, and a lever pivoted in said casing and having opposite ends of which one end is floatingly pivotally connected with said plunger shank, and the other end projects into said compartment, with said lever being on said plunger displacement swung to slide said can with said other lever end toward said abutment for depression of said valve by said abutment.

14. An underinflation telltale device as in claim 13, in which there is further provided in said chamber an apertured collar through which said plunger shank extends with sliding freedom, and said spring means is a compression spring interposed between said collar and said other plunger face.

* * * * *